Nov. 28, 1933. R. V. MORGENSTERN ET AL 1,936,947
TELEGRAPH SYSTEM
Filed Oct. 5, 1931 4 Sheets-Sheet 1
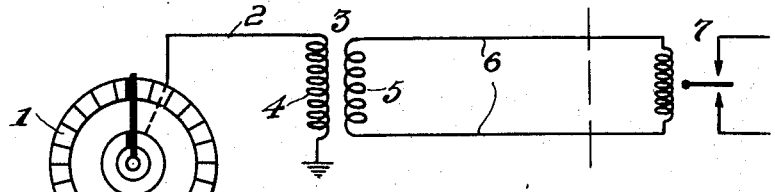
Fig. 1ª.
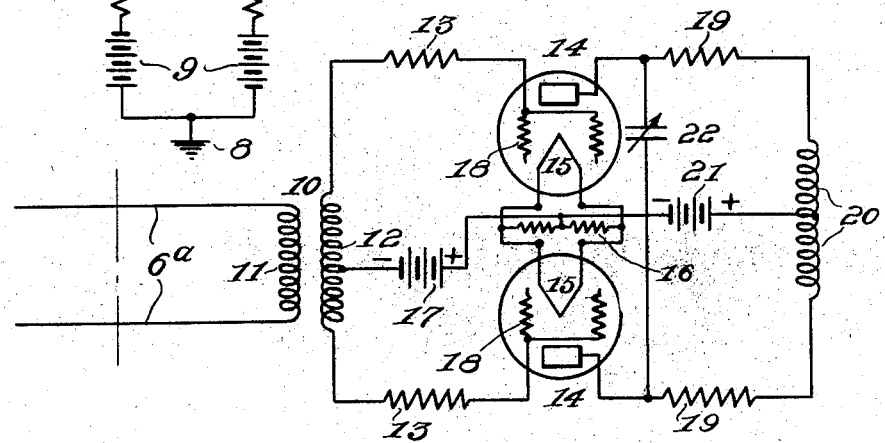
Fig. 1ᵇ.
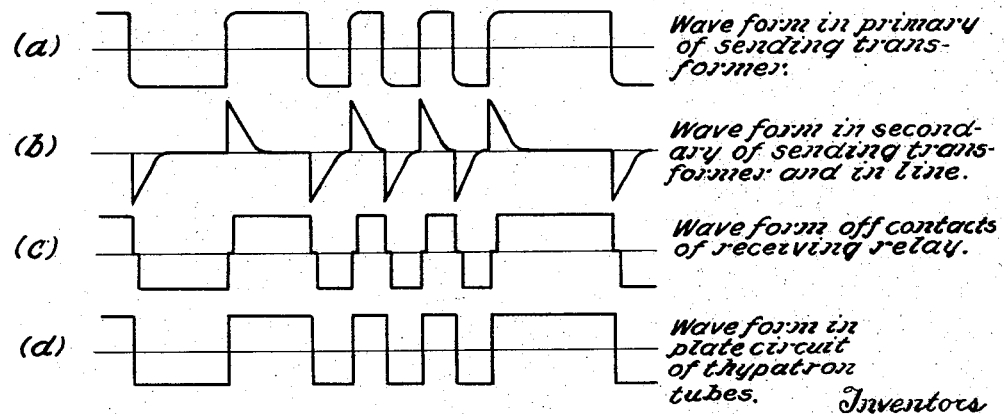
(a) Wave form in primary of sending transformer.
(b) Wave form in secondary of sending transformer and in line.
(c) Wave form off contacts of receiving relay.
(d) Wave form in plate circuit of thypatron tubes.
Fig. 2.
Inventors
R. V. Morgenstern.
J. H. Hackenberg
Eugene E. Brown
Attorney

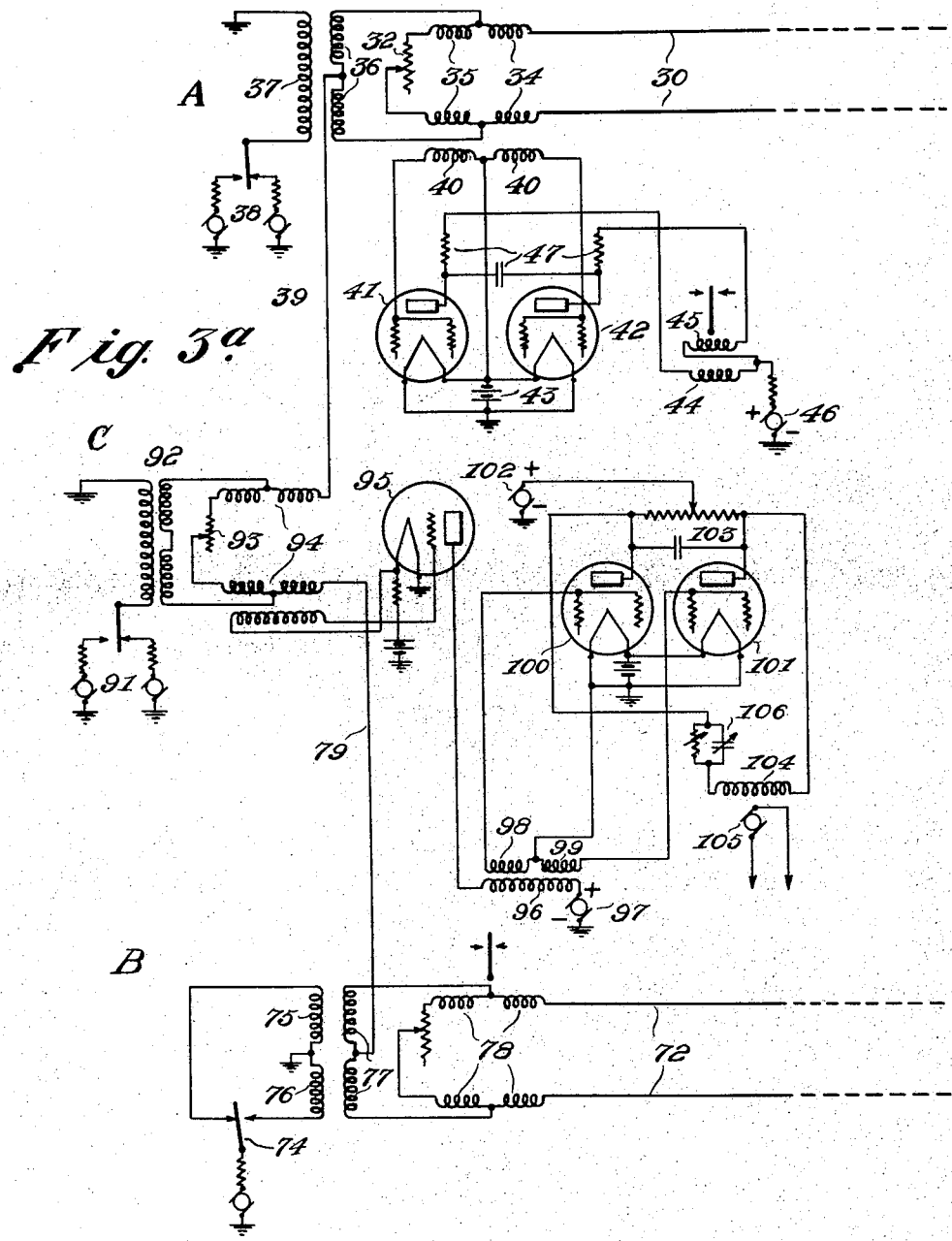

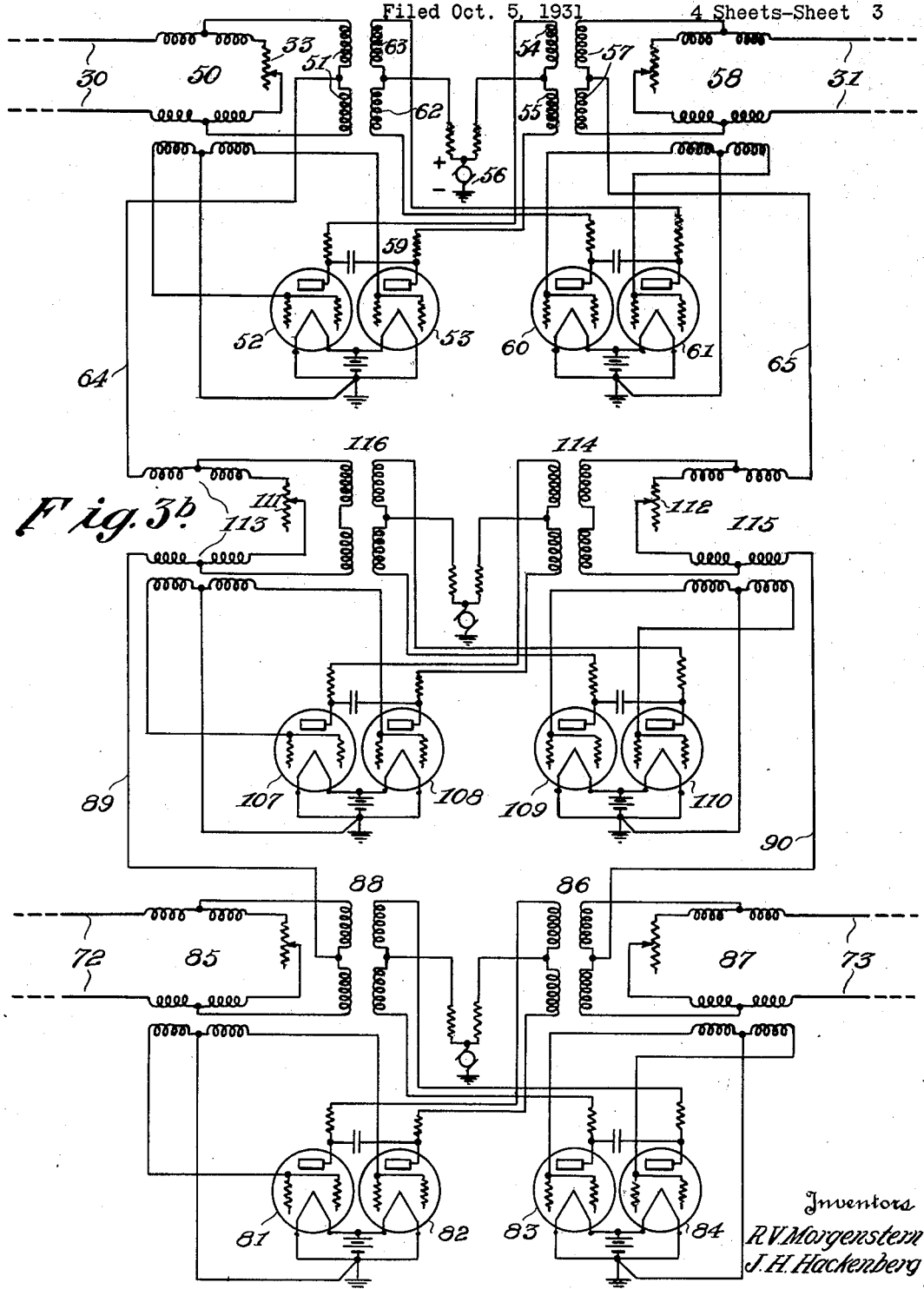

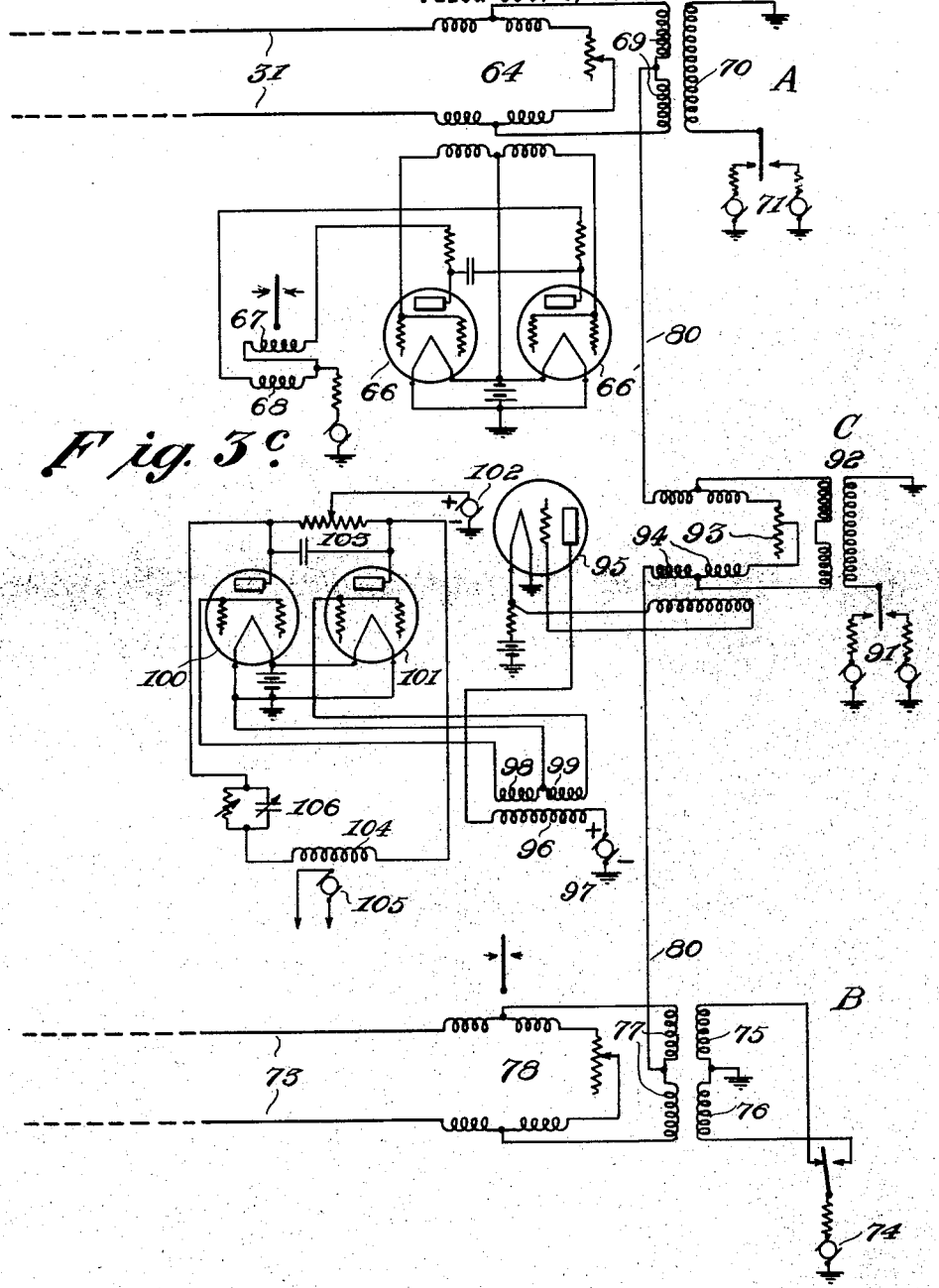

Patented Nov. 28, 1933

1,936,947

UNITED STATES PATENT OFFICE 1,936,947

TELEGRAPH SYSTEM

Ronald V. Morgenstern, Irvington, and John H. Hackenberg, Jackson Heights, N. Y., assignors to The Western Union Telegraph Company, New York, N. Y., a corporation of New York Application October 5, 1931. Serial No. 567,104

7 Claims. (Cl. 178—68)

This invention relates to the transmission of telegraph signals and in particular to a system of impulse or induced current telegraphy in which the unequal attenuation by the line of short and long signals is to a substantial degree suppressed.

An object of the invention is to transform a signal wave which is substantially square-top in shape into a series of separate sharp peaks of current which mark the beginning of the individual signal impulses of the original square-top wave, and to transmit these sharp peaks of current over the transmission line.

It is a further object of the invention to convert a received wave form comprising separate sharp peaks of current into a wave substantially square-top in shape and to utilize the square-top converted wave for operating receiving or repeating apparatus.

Other objects of the invention are to provide duplexed or superposed, or duplexed and superposed systems embodying the above mentioned features.

A related object of the invention is to eliminate distortion and to make possible the transmission of signals at increased signaling speeds.

The invention in an improved form makes use of thyratron tubes for the reception and conversion of the series of sharp peaks of current into a wave form substantially square-top in shape. However, within certain limits it is possible to practice the invention with the use of the ordinary polar relay.

Figure 1a shows an embodiment of the method of signal transmission of this invention in a simple circuit comprising a transmitting distributor and a receiving polar relay of ordinary type.

Figure 1b shows an alternative method of receiving the signals by means of thyratron tubes.

Figure 2 shows the general shape of the signal wave at various stages and in various forms of the invention:

(a) represents the wave form in the primary of the sending transformer.

(b) represents the wave form in the secondary of the sending transformer and in the line.

(c) represents the received wave form off the contacts of the receiving relay when a polar relay is used.

(d) represents the received wave form in the plate circuit when thyratron tubes are used in place of a polar relay.

Figures 3a, 3b and 3c, when taken together, show a complete superposed group operating over two sections of line, using impulse signaling, AA being one side circuit, BB the other side circuit and CC the superposed or "phantom" circuit. It is to be noted that various modifications of the transmitting and of the receiving apparatus according to the invention are shown at the several terminals of the side and phantom circuits.

The fundamental principles underlying the operation of the system of impulse or induced current telegraphy according to this invention will be explained by reference to the simple circuit of Fig. 1a in which: 1 represents a distributor connected by conductor 2 to one terminal of a sending transformer 3 comprising primary 4 and secondary 5. The primary 4 is grounded at its second terminal to complete a circuit by way of the earth back to grounded terminal 8 of the current source 9, connected to distributor 1. The terminals of secondary 5 of the sending transformer are connected by line conductors 6, 6 to the winding of a receiving polar relay 7.

Operation of the distributor will cause a flow of current in the primary 4 of the sending transformer 3, having a wave form like that shown in Fig. 2a. These signals are essentially square-top in shape, attenuated slightly on the front side, as shown, due to the inductance of the primary. The frequency will depend, of course, upon the speed of the distributor and the connections of the segments.

Assuming, for the sake of generalization, that the frequency is not constant but that the signal length varies from signal to signal as shown in the curves of Fig. 2: The voltage induced into the secondary is given by the equation—

$$e = -M \frac{di_p}{dt}$$

where $i_p$ is the instantaneous value of primary current and M is the mutual inductance of the two windings. In other words, as long as the primary current is changing, a voltage is induced in the secondary; but by the time the primary current has reached its steady state value, the secondary voltage will have risen to a maximum and then fallen to zero.

The secondary current will then be a series of sharp peaks, one at the start of each signal, and will have the general form shown in Fig. 2b.

If the inductance of the primary is kept low enough, so that the primary current reaches its steady state value before reversal occurs for the shortest signal, then for all frequencies up to that determined by this shortest signal, the secondary impulses will be alike, regardless of the frequency. This means that the short and long signals are attenuated equally by the line, and characteristic distortion is eliminated.

When, as in Fig. 1$^a$, an ordinary polar relay is used at the receiving end, the relay is energized by these impulses and the armature moves from one contact to the other in response. After it has once crossed to one contact due to the action of an impulse, it remains there due to the residual magnetism of the relay until the next impulse reaches it. The armature and contacts then may be made to recreate the signal impressed upon the primary of the sending transformer. Fig. 2$^c$ shows the signals as they would appear off the contacts of the receiving relay. The short horizontal lines between impulses represent intervals in which the armature of the polar relay is passing from one contact to the other.

If there is in the line induction of sufficient value to overcome the residual magnetism of the relay, (as would be the case if one of the lines were replaced by a ground return or in metallic circuits in some cases where an unbalance exists) then some arrangement must be made for holding the armature on its contact until the next impulse is received. This may be done by any of several simple locking circuits, in the manner which will be obvious to engineers.

Fig. 1$^b$ illustrates a more satisfactory receiving arrangement and one which allows of higher signaling speeds than is possible with the usual relay shown in Fig. 1$^a$. The receiving relay of Fig. 1$^a$ is replaced by a receiving transformer 10, having its primary 11 connected to the line conductors 6$a$, 6$a$. The secondary 12 of the receiving transformer is connected through suitable grid resistors 13 to the grid cathode circuits of a pair of grid-control rectifiers or thyratron tubes 14. As illustrated, the cathodes 15, 15 of the thyratron tubes are connected in parallel across a resistance 16, and a conductor extends from the electrical mid-point of resistance 16 through battery 17 to the electrical mid-point of the secondary 12 of the receiving transformer 10. Here the grid-cathode circuits of the tubes 14, 14 extend through the two halves of the secondary 12 and the respective grid resistors 13, 13 to the grids 18, 18 of the thyratron tubes. The heating circuits of the cathodes are not shown.

The plate circuits of the thyratron tubes 14 extend through suitable plate resistors 19, 19, coils 20, 20, and a source 21 of positive plate potential to the mid-point of resistance 16. The coils 20, 20 may be the windings of a relay, or the primary of a sending transformer for another section of line, or the fields of a generator.

The adjustable condenser 22 is connected between the plates of the two thyratron tubes 14.

The wave shape of the combined current in the two coils 20, 20 or the voltage across them is represented in Fig. 2$^d$.

The operation of the system according to Fig. 1$^b$ is obvious. The original square-top wave from distributor 1, or some equivalent transmitting apparatus of wave form shown in Fig. 2$^a$, having been transformed into a series of sharp peaks of current having a wave form like that shown in Fig. 2$^b$, and transmitted over the line, is received in the transformer 10 and the impulses of alternate polarity are applied to the grids of the thyratrons. An incoming impulse of one polarity is applied to thyratrons in such a direction as to render one of the thyratrons conducting, while a succeeding impulse of the opposite polarity is applied in such a direction as to render the second thyratron conducting. The circuits of the tubes are arranged, in the usual manner, so that the starting of the second tube causes a drop in the plate voltage of the first tube below the point at which conductivity can be maintained, so that the starting of the second tube renders the first tube non-conductive, and vice versa. The combined effect of the alternate flow and cessation of current in the plate circuits of the two thyratrons is represented in Fig. 2$^d$.

It will be apparent therefore that when using a system according to Fig. 1$^b$, the signal of wave form according to Fig. 2$^a$ is transformed by the sending transformer 3 into a wave form like that shown in Fig. 2$^b$ and is received by the receiving transformer 10 and thyratrons 14, 14 and converted into a wave form like that shown in Fig. 2$^d$. Thus the original square-top wave is reconverted, after transmission over the line, into a square-top wave having substantially the same form as the original wave.

Similarly, when using a system according to Fig. 1$^a$, a signal of wave form like that of Fig. 2$^a$ is transformed by the sending transformer 3 into a wave form like that of Fig. 2$^b$ and after transmission over the line in the form shown in Fig. 2$^b$, is received by the usual polar relay and converted into a wave form like that shown in Fig. 2$^c$. Disregarding the small gaps between impulses the wave of Fig. 2$^c$ is substantially a duplicate of the original square-top wave of Fig. 2$^a$.

In order that the system may be duplexed and/or superposed, it is necessary to provide the receiving transformer with four equal primaries, two to be used in the line and two as the artificial line coils. The secondary of the sending transformer must be center-tapped to provide for the phantom connection.

In the duplexed and superposed system illustrated in Figs. 3$^a$, 3$^b$ and 3$^c$, AA represent the terminals of one side circuit, each comprising transmitting and receiving apparatus; BB represent the terminals of the second side circuit each comprising transmitting and receiving apparatus; CC represent the terminals of the phantom circuit each comprising phantom transmitting and receiving apparatus.

At the terminals A and B different variations of the transmitting apparatus according to this invention are shown. At the terminals, A, B and C different variations of the receiving apparatus according to this invention are shown. Repeating apparatus is illustrated for each of the side and phantom circuits. The repeaters are all shown alike although it may sometimes become necessary to incorporate, in the phantom repeater, vacuum tube amplifiers, as shown at the terminals of the phantom.

The distinguishing features shown in the various modifications of transmitter are that at the terminals AA both positive and negative battery are used for transmission, while at terminals BB only one pole of battery is used. At the phantom circuit terminals CC, as at terminals AA, both positive and negative battery are used. But it is obvious that other forms of transmitter embodying the features of this invention may be substituted for the forms shown.

The distinguishing features of the various modifications of receiver are that at the terminals AA a pair of thyratron tubes with a relay in the plate circuits is shown as the receiver, while at the terminals BB the standard metallic circuit line relay is used at the terminal and the tubes omitted. The phantom circuit terminals CC include two more variations, namely, the use of a three-element thermionic vacuum tube as an amplifier of the received impulses before they are impressed upon the grids of the thyratrons, and the connection into the plate circuits of the tubes of the fields of a generator and the associated shaping apparatus. The armature of the generator may then be connected into another line section or into a local circuit.

The transmission at any terminal may be from a fork, a relay, a commutator or from a multiplex distributor.

Referring now in detail to the apparatus in Figs. 3a, 3b and 3c:

The side circuit AA comprises two line sections including line conductors 30 and 31 respectively. The first line section is balanced at its two ends by suitable artificial lines 32 and 33, in order to permit duplex operation thereover. The receiving transformer by which the line section 30 is terminated at the terminal A comprises four equal primaries, two of these, 34—34, being connected in the line conductors and the other two, 35—35, in the conductors leading to the balancing artificial line 32.

The secondary 36 of the transmitting transformer has its terminals connected to the two junctions of the line and artificial line coils 34, 35. The primary 37 of the transmitting transformer 36, 37 is grounded at one terminal and at the other is connected to a transmitter 38, represented diagrammatically as comprising both positive and negative battery, the armature of the transmitter being permanently connected to the terminal of primary 37 and operating between contacts connected to positive and negative battery as indicated.

The secondary 36 of the transmitting transformer is tapped at its mid-point, or is divided into two equal coils, to permit the connection, at the mid-point, of the phantom circuit conductor 39 which leads to the phantom circuit terminal apparatus at C, to be described hereinafter.

In addition to the four equal primaries 34, 34, 35, 35 the receiving transformer comprises two equal secondaries 40, 40 the common point of which is connected to the filaments of a pair of thyratron tubes 41, 42. The filaments are fed in parallel from a common source 43 and grounded. This source of filament heating power may be direct current as shown, or alternating current. The secondaries 40, 40 of the receiving transformers are connected at their free terminals to the grids of the thyratron tubes 41, 42. Stabilizing battery (#17 of Fig. 1b) may be inserted in the grid filament circuits of the thyratrons.

The plate circuits of the thyratron tubes include the coils 44 and 45 of a receiving polar relay and the common current source 46, the other terminal of which is grounded in order to complete a circuit to the grounded filaments. The circuits of the thyratron tubes 41 and 42 are so arranged, as by means of the impedance network indicated generally at 47, that when tube 41 is operative and thereafter tube 42 starts, tube 41 becomes non-conductive, and vice versa. This action is explained in greater detail in the description of the operation of the system, hereinafter.

As already stated, the opposite end of line section 30 is balanced for duplex operation by means of a balancing artificial line 33 and a receiving transformer 50 having four equal primaries and two equal secondaries. These primaries and secondaries are arranged similarly to the primaries 34, 35 and secondaries 40 of the receiving transformer at terminal A, already described. The secondary 51 of a transmitting transformer which forms part of the repeating apparatus, is connected to the junctions of the line and artificial line coils of receiving transformer 50. The secondaries of receiving transformer 50 are connected in the grid circuits of thyratron tubes 52, 53. The plate circuits of tubes 52, 53 includes coils 54 and 55 which correspond generally to coils 44 and 45 of tubes 41 and 42. However, the coils 54 and 55 form part of the repeating apparatus and feed into the second line section 31, instead of actuating the armature of a receiving polar relay as do the coils 44 and 45.

The plate circuits of the thyratrons 52, 53 include, in addition to the coils 54, 55, a common source of current 56 and a network for rendering one thyratron non-conductive when the other is started and vice versa. This network may be similar to network 47 associated with thyratrons 41 and 42.

The coils 54 and 55 form the primaries of a repeater transmitting transformer, the secondary 57 of which is connected to the junctions of the line and artificial line coils of a receiving transformer 58 connected to line section 31. The secondaries of the receiving transformer 58 are connected in the grid circuits of another pair of thyratron tubes 60, 61 forming part of the repeating apparatus. The plate circuits of thyratrons 60, 61 are fed from the source 56 and include coils 62 and 63 which form primaries of the repeater transmitting transformer having the secondary 51 already referred to.

The secondaries 51 and 57 of the repeater transmitting transformers are both centrally tapped to permit connection thereto of phantom circuit conductors 64 and 65, respectively, which lead to the phantom circuit repeater apparatus to be described hereinafter.

The distant end of line section 31 at terminal A comprises apparatus similar to that at terminal A connected to line section 30. That is, it comprises a receiving transformer 64 associated with a balancing artificial line to provide duplex operation over line section 31. The secondaries of the receiving transformer 64 are connected in the grid circuits of a pair of thyratrons 66, 66'. The plate circuits of the thyratrons include coils 67 and 68 of a receiving polar relay. To the neutral points of receiving transformer 64 are connected the terminals of the secondary 69 of a transmitting transformer having its primary 70 connected to the transmitter 71 at terminal A.

The secondary 69 of the transmitting transformer at terminal A of line section 31 is tapped at its mid-point for connection to a phantom circuit conductor 80 which leads to phantom circuit terminal apparatus at the second C terminal.

The side circuit B, B comprises a pair of line sections 72, 73. Each of the line sections is balanced at each end by artificial lines for permitting duplex operation over the line sections. The two line sections are joined by repeating apparatus similar to that joining the line sections 30 and 31 of side circuit AA. Each B terminal is provided with a transmitter 74 diagrammatically represented as comprising a generator having one terminal grounded and the other terminal arranged for connection to the free terminal of either of two coils 75 and 76, the common point of which is grounded. The coils 75, 76 form alternate primaries of a transmitting transformer, the secondary 77 of which is connected to the neutral points of the receiving relay 78. The receiving relay is represented diagrammatically as comprising four coils, two connected to line and two to the balancing artificial line.

The secondaries 77 of the transmitting transformers at the near and distant B terminals are tapped at their mid-points by conductors 79 and 80' respectively for connection to the phantom circuit terminal apparatus at terminals C.

Briefly, the repeating apparatus for side circuit BB comprises two pairs of thyratrons 81, 82 and 83, 84. One pair is designed for transmitting from line section 72 to line section 73, and the other pair for transmitting from line section 73 to line section 72. The grid circuits of the pair 81 and 82 are connected to the secondaries of the repeater receiving transformer 85 in line section 72 and the plate circuits of the pair 81 and 82 are connected to the primaries of repeater transmitting transformer 86 for line section 73. Similarly, the grid circuits of the pair 83, 84 are connected to the secondaries of the repeater receiving transformer 87 in line section 73, and their plate circuits to the primaries of the repeater transmitting transformer 88 for line section 72.

The mid-points of the secondaries of repeater transmitting transformers 88 and 86 are connected respectively to phantom circuit conductors 89 and 90. These phantom circuit conductors lead to the phantom circuit repeater apparatus.

The phantom circuit CC extends from the near terminal C by way of conductors 39 and 79 to the mid-points of the A terminal transmitting transformer secondaries, thence over the line conductors 30 in parallel and the line conductors 72 in parallel to the mid-points of the secondaries of the repeater transmitting transformers, and by way of conductors 64 and 89 to the phantom circuit repeater apparatus.

The output of the phantom circuit repeater apparatus extends by way of conductors 65 and 90 to the mid-points of the secondaries of the repeater transmitting transformers for line sections 31 and 73 respectively, thence over the conductors of the respective line sections in parallel to the mid-points of the transmitting transformer secondaries at the distant A and B terminals, and by way of conductors 80 and 80' to the phantom circuit apparatus at the distant C terminal.

As illustrated, the phantom circuit terminal apparatus at each terminal C comprises a transmitter 91 similar to that shown at side circuit terminals A. The transmitter 91 is arranged to supply positive and negative current to a phantom transmitting transformer 92. The phantom circuit is balanced for duplex operation by an artificial line 93, the secondary of transformer 92 being connected to the neutral points of a phantom receiving transformer 94. The secondary of receiving transformer 94 is connected to grid and filament of a three element thermionic vacuum tube amplifier 95. The plate circuit of amplifier tube 95 includes the primary 96 of a coupling transformer and a source 97 of plate current. The two secondaries 98 and 99 of the coupling transformer are connected in the grid circuits of a pair of thyratrons 100, 101. The plate circuits of the thyratrons include the common generator 102 and the usual network 103 designed to cause one thyratron to stop when the other starts. Across the terminals of the network 103 is connected a field winding 104 of a generator having its armature 105 connected to the phantom local receiving circuit or to another line section. Suitable adjustable shaping apparatus 106 is associated with the field 104 of the generator so that the wave form induced in the armature 105 may be adjusted to be of proper shape.

The apparatus shown at the distant terminal C duplicates that already described.

The phantom circuit repeating apparatus is connected between conductors 64, 89 and conductors 65, 90 and comprises two pairs of thyratrons 107, 108 and 109, 110. The sections of the phantom circuit at the repeater are balanced by artificial lines 111 and 112. Thyratrons 107 and 108 are controlled by phantom repeater receiving transformer 113 and feed into the phantom repeater transmitting transformer 114, thence over conductors 65 and 90. Similarly, thyratrons 109, 110 which repeat in the opposite direction, are controlled by phantom repeater receiving transformer 115 and feed into phantom repeater transmitting transformer 116, thence over conductors 64 and 89.

The operation of the duplexed and superposed system of Figs. 3ª, 3ᵇ and 3ᶜ is as follows:—

The wave form of the signal in the primary of the sending transformer of either side circuit or of the phantom circuit is assumed to be substantially square-top, as shown in Fig. 2ª. This signal wave may, as already stated, be produced by a fork, a relay, a commutator, a multiplex distributor, or the like, the diagrammatic showing of the transmitter at 38, 71, 74 and 91 being intended to represent any transmitter capable of producing a signal wave of the desired type.

Assuming that a signal is being transmitted over the side circuit AA from transmitter 38 and that the signal wave in primary 37 has the form shown in Fig. 2ª: The wave is attenuated slightly on the front due to the inductance of the primary but is essentially square-top in shape so that the current in the secondary 36 has the form of a series of sharp peaks of current occurring at the same relative intervals as the changes in the primary current. That is, a sharp peak of current is produced in the secondary 36 every time the primary current changes, and there are intervals of no current in the secondary 36 whenever the primary current is steady. By reference to Fig. 2ᵇ it will be seen that a sharp peak occurs at the start of each signal, or, speaking accurately, at the end of one signal and start of another.

If the inductance of the primary is kept low enough so that the primary current reaches its steady state value before reversal occurs for the shortest telegraph signal, then for all signal frequencies transmitted to the primary up to that determined by the time constant of the primary, the secondary impulses will be alike regardless of the frequency of the telegraph signals.

The sharp peaks of current of Fig. 2ᵇ are transmitted over the line section 30 of side circuit AA without affecting the receiving apparatus connected to thyratrons 41, 42 since this latter is arranged in conjugate or non-interfering relation with respect to the transmitter 38. Because the current peaks are alike for all signals, the short and long telegraph signals are attenuated equally by the line 30 and characteristic distortion is substantially eliminated. The same is true for transmission over the other line sections.

The signal peaks of Fig. 2b incoming from line 30 at the receiving transformer 50 are applied to the grids of the thyratrons 52 and 53. These peaks, alternately of positive and negative polarity, are applied to the grids of the thyratrons in such a direction as to make the tubes tend to start alternately. If an incoming impulse starts the thyratron tube 52 current flows in its plate circuit and continues to flow therein until the next incoming impulse starts the other thyratron 53. When thyratron 53 starts, the plate voltage on thyratron 52 is reduced and the latter is rendered non-conductive. Similarly, when the next succeeding incoming impulse starts the non-inoperative tube 52, the plate voltage on thyratron 53 is in turn reduced by the operation of the network 59 in the plate circuits of thyratrons 52 and 53, and thyratron 53 is in turn rendered inoperative.

Thus the series of sharp current pulses in line 30 produce alternate starting pulses in the grid circuits of thyratrons 52 and 53, and cause the production of square-top half waves in the coils 54 and 55 of the repeater transmitting transformer. If the square-top half waves were properly combined they would produce a wave form like that shown in Fig. 2d. The alternate square-top pulses in coils 54 and 55 by transformer action produce in the secondary 57 of the repeater transmitting transformer another identical series of sharp current peaks, like that shown in Fig. 2b. This series is transmitted over line section 31 of side circuit AA without affecting the other channel of the repeater, that is, the channel including thyratrons 60, 61. The receiving transformer 64 at the distant terminal A applies the series of impulses to the grid circuits of receiving thyratrons 66, 66' to cause alternate operation of the latter. In the plate circuits of thyratrons 66, 66' is produced a combined wave form like that shown in Fig. 2d which causes operation of the armature of the receiving polar relay 68, 69 to reproduce the original signals.

The operation of the side circuit AA for a signal sent from transmitter 71 is the same as for a signal sent from transmitter 38. That is, the distributor or other transmitter 71 sends to the primary 70 a wave form like that shown in Fig. 2a. By transformer action there is produced in the secondary 69 a series of peaks of current like those shown in Fig. 2b which are transmitted over section 31 of side circuit AA. At the repeater, thyratrons 60, 61 produce square-top impulses in their plate circuits which, in turn, produce a second series of current peaks like those in Fig. 2b. The second series is transmitted over section 30 of side circuit AA and converted by the combined action of thyratrons 41, 42 into a wave form like that shown in Fig. 2d.

The operation of the side circuit BB is not greatly different from that of side circuit AA. At terminal B the transmitter 74 sends out a square-top wave like that in Fig. 2a. This is transformed in the secondary 77 into a series of sharp peaks of current like those shown in Fig. 2b and transmitted in that form over line section 72 to the repeater. By the action of the repeater receiving transformer 85 the received current peaks apply starting voltages to the grids of thyratrons 81, 82 and the latter are operated alternately to produce square-top impulses of opposite signs in the primaries of the repeater transmitting transformer 86. From the secondary transformer 86 a second series of current peaks like those in Fig. 2b are transmitted over the line section 73 to the coils of the receiving polar relay 78. In the local circuit of the polar relay 78 diagrammatically indicated by the armature and contacts of the relay, a wave form is produced which corresponds to that shown in Fig. 2c.

Similarly a signal sent from transmitter 74 of side circuit BB having the form shown in Fig. 2a, is transformed in the secondary 77 of the transmitting transformer into a series of current peaks of the form shown in Fig. 2b, for transmission over section 73 of side circuit BB. At the repeater these current peaks are converted by thyratrons 83, 84 into square-top current impulses which when combined would produce a wave form like that shown in Fig. 2d. The square-top impulses are in turn converted in the secondary of transformer 88 into a second series of current peaks similar to Fig. 2b. These are sent over line section 72 of side circuit BB and received in the coils of the receiving polar relay 78. The wave form off the contacts of receiving relay 78 has the form of Fig. 2c.

It has already been pointed out that an ordinary polar relay can be used in a system according to this invention only in case there is not present on the line induction of sufficient value to overcome the residual magnetism of the polar relay. If for example one of the conductors 72 were replaced by a ground return, or if an unbalance existed in the metallic circuit 72, there might be sufficient induction in the line to overcome the residual magnetism of the relay so that the relay might fail to hold its armature on a given contact until the next signal impulse were received. To overcome this a simple locking circuit may be restored to. This is not illustrated specifically but the diagrammatic representation at 78 is intended to represent a receiving relay with or without such a locking circuit, as circumstances may require.

The operation of the phantom circuit between terminals CC is as follows: The transmitter 91 at the near terminal causes the flow in the primary of transformer 92 of a signal having the wave form shown in Fig. 2a. In the secondary a wave form like that of Fig. 2b is produced, and is transmitted over conductors 39 and 79, and the phantomed line sections 30 and 72 to the phantom circuit repeater by way of conductors 64 and 89. Here the sharp peaks of current are applied to the grids of thyratrons 107 and 108 as starting impulses, causing alternate operation of the thyratrons and the production in the plate circuit of the thyratron tubes, by way of the primaries of transformer 114, of a wave form like that of Fig. 2d. By transformer action the square-top waves are converted into a wave in the secondary of transformer 114 having a wave form like that of Fig. 2b. This last mentioned wave is transmitted by way of conductors 65 and 90 to the phantomed line sections 31 and 73, and by way of conductors 80 and 80' to the phantom receiving transformer 93 at the distant terminal C. The impulses thus received are amplified in the three element amplifier tube 95 and the amplified current is passed through primary 96 of a coupling transformer having secondaries 98 and 99 connected in the grid circuits of thyratrons 100 and 101. In the plate circuit of the thyratrons there is produced a square-top wave form like that shown in Fig. 2d which supplies the field 104 of a generator, the latter having its armature 105 connected in a local circuit or to another line section. If necessary, the wave in the plate circuit of the thyratrons is suitably shaped by the network 106 or equivalent means.

The operation of the phantom circuit CC in the opposite direction is similar to that just described. In this case the other channel of the phantom repeater, including thyratrons 109 and 110, is used, and the circuit may be traced from transmitter 91, transformer 92, conductors 80 and 80', phantomed line sections 31 and 73, and conductors 65 and 90 to the repeater by way of receiving transformer 115. From the plate circuit of thyratrons 109 and 110 the circuit then extends through transformer 116, conductors 64 and 89, phantomed line sections 30 and 72, and conductors 39 and 79 to the receiving transformer 94, amplifier 95, thyratrons 100 and 101 to the generator 104, 105 and its associated apparatus.

It will be obvious that the transmissions in two directions over side circuit AA do not interfere with each other nor with the phantom circuit transmissions nor with the transmissions in side circuit BB. Similarly, the transmissions in opposite directions over side circuit BB do not interfere with each other or with the transmissions over circuits AA and CC. The transmissions in opposite directions over the phantom circuit CC do not interfere with each other or with the transmissions over the side circuits AA and BB. For this condition of non-interference to exist, however, the various circuits and the corresponding pieces of apparatus therein must be duplicates of one another or carefully balanced against one another. Symmetrically placed coils of the various transformers must be balanced. It is believed unnecessary to point out specifically all the pairs of elements which must be balanced, as this is a matter which will be obvious to one skilled in the art, in the light of the disclosure of the principles of this invention.

Although the method and means of this invention have been described in connection with a preferred embodiment thereof, it is obvious that the invention is not limited to the particular systems disclosed but is capable of considerable modification without departure from the spirit of the invention.

We claim:

1. A system of impulse telegraphy comprising means for transmitting a square-top wave, a line, a transformer having its primary connected to said transmitting means and its secondary to line, whereby said transformer produces from said square-top wave a series of sharply peaked current impulses, one at the start of each square-top impulse, a receiver connected to line and means in said receiver for converting said series of peaked impulses into a square-top wave corresponding to said original transmitted wave.

2. A system of impulse telegraphy comprising means for transmitting a square-top wave, a line, a transformer having its primary connected to said transmitting means and its secondary connected to line whereby a series of non-continuous sharply peaked impulses of alternate polarity are transmitted to said line, a receiver comprising a pair of thyratron tubes oppositely connected to line and arranged to produce from said non-continuous peaked impulses a square-top wave substantially continuous in form.

3. A system of impulse telegraphy comprising means for transmitting a square-top wave, a line, a transformer having its primary connected to said transmitting means and its secondary connected to line, whereby a series of non-continuous sharply peaked impulses of alternate polarity are transmitted to said line, a receiver connected to line comprising means for amplifying said peaked impulses, a pair of thyratron tubes arranged to convert said amplified peaked current impulses into a square-top continuous wave, a generator comprising a field winding connected to said thyratron tubes to receive said square-top continuous wave, and a signal receiving circuit connected to the armature of said generator.

4. The method of communicating over a telegraphic circuit which comprises producing a square-top signal wave, transforming said wave by inductive action into a second wave comprising a series of sharply peaked current impulses having one peaked impulse at the start of each square-top impulse of said square-top signal wave, transmitting said series of peaked impulses, receiving said series of peaked impulses, and converting said series of peaked impulses into a square-top wave corresponding to said original signal wave.

5. The method of communicating over a telegraphic circuit which comprises producing a square-top signal wave substantially continuous in form, transforming said wave by inductive action into a second wave comprising a series of non-continuous sharply peaked current impulses having one peaked impulse at the start of each square-top impulse of said square-top signal wave, amplifying said series of non-continuous peaked current impulses by converting it into a square-top wave of increased energy content, retransforming by inductive action said amplified wave into a second series of peaked current impulses, transmitting said last named impulses, receiving said retransmitted series of peaked impulses and converting it into a square-top wave corresponding to said original square-top signal wave.

6. A system for converting a non-continuous wave made up of peaked current impulses into a square-top continuous wave, comprising a pair of thyratron tubes and matched input and output circuits therefor, said input circuits comprising means for applying peaked non-continuous current impulses to said thyratron tubes as starting voltages therefor, said output circuits comprising means for causing the starting of either tube to stop the other tube, whereby the peaked impulses cause the production in the combined output circuit of the thyratron tubes of contiguous square-top impulses to produce a wave continuous in character.

7. In a system of impulse telegraphy as set forth in claim 1, the primary of said transformer having a low inductance such that the primary current reaches a substantially steady state before reversal occurs for the shortest signal impulse, whereby all signals are attenuated equally over the line and distortion is eliminated.

RONALD V. MORGENSTERN.
JOHN H. HACKENBERG.

DISCLAIMER 1,936,947.—*Ronald V. Morgenstern*, Irvington, and *John H. Hackenberg*, Jackson Heights, N. Y. TELEGRAPH SYSTEM. Patent dated November 28, 1933. Disclaimer filed September 16, 1942, by the assignee, *The Western Union Telegraph Company*.

Hereby enters this disclaimer to claim 6 of said patent.

[*Official Gazette October 13, 1942.*]